United States Patent [19]
Philippe

[11] Patent Number: 5,574,635
[45] Date of Patent: Nov. 12, 1996

[54] AC-DC CONVERTER COMPRISING A FILTERING DEVICE

[75] Inventor: Daniel Philippe, St. Martin le Vinoux, France

[73] Assignee: Schneider Electric SA, France

[21] Appl. No.: 341,096

[22] Filed: Nov. 17, 1994

[30] Foreign Application Priority Data

Nov. 24, 1993 [FR] France .................................. 93 14144

[51] Int. Cl.[6] ...................................................... H02M 1/12
[52] U.S. Cl. .............................. 363/124; 363/40; 363/44
[58] Field of Search .............................. 307/44–46, 105; 363/39–44, 79–82, 84, 87, 90, 124–125

[56] References Cited

U.S. PATENT DOCUMENTS 4,386,394 5/1983 Kocher et al. .............................. 363/20
5,345,375 9/1994 Mohan ........................................ 363/40

FOREIGN PATENT DOCUMENTS

WO89/05059 6/1989 WIPO .
WO93/12576 6/1993 WIPO .

*Primary Examiner*—Peter S. Wong
*Assistant Examiner*—Aditya Krishnan
*Attorney, Agent, or Firm*—Parkhurst, Wendel & Burr, L.L.P.

[57] ABSTRACT

The converter comprises a rectifier circuit, choppers, chopper control circuits and an input filter of LC type. The control circuits comprise loops regulating the output voltages and the currents of the choppers, and a loop regulating the current flowing in the filter and rectifier. This additional regulation enables oscillations generated in the input filter by the current steps to be dampened. The values of the positive and negative components of the currents in the input filter and rectifier are supplied to the control circuits by sensors.

7 Claims, 6 Drawing Sheets

AC-DC CONVERTER COMPRISING A FILTERING DEVICE

BACKGROUND OF THE INVENTION

The present invention relates to an AC-DC converter including:

an input line comprising at least two conductors, rectifying and filtering means connected to the input line, and means for monitoring and regulating a DC output voltage connected to the output of the rectifying and filtering means.

AC-DC converters generally comprise a rectifier bridge to rectify the AC current of the input line and a regulating device supplying on output of one or more regulated DC voltages. In converters without isolation between the input and output, a neutral conductor of the input line can be placed directly on the output, and will act in most cases as voltage a reference for the whole converter. Devices supplying high-power DC voltages typically include, chopper circuits, especially when the output voltage has to be greater than the input voltage. The rectifier, generally formed by diodes or thyristors, and the chopper circuits disturb the input line current increasing harmonic distortion. These disturbances are attenuated by a filtering circuit comprising inductors fitted in series on the input line before the rectifier and capacitors fitted in parallel on the rectifier output before the chopper circuits.

This filtering circuit is an LC or RLC filter of an order higher than one whose operation may be disturbed by current steps when the rectifier circuit diodes or thyristors are turned on. These current steps excite the filtering circuit and set it in oscillation at each switching. These oscillations, which are only slightly dampened by the low resistance of the circuits and of the power system, produce stray current which are superposed on the power system current. Overdimensioned filtering circuits exist which limit the oscillation effects by greatly decreasing the LC filter resonance frequency. The values of the input inductances and of the capacitors, as well as the volume and cost of the filtering circuit however, are very high.

SUMMARY OF THE INVENTION

The object of the invention is to provide a converter comprising a filtering device with oscillation dampening.

According to the invention, the output voltage control and regulating means comprise means for measuring the current in the rectifying and filtering means, and means for regulating the output voltage in accordance with the currents measured by said measuring means.

According to a first embodiment of the invention, the rectifying and filtering means comprise a rectifier circuit, wherein the means for measures the current measuring the rectifier circuit input currents.

Further, according to the first embodiment, the means for measuring the current comprises a current measuring transformer associated with each line conductor, and a detection circuit for supplying to the regulating means signals representative of the positive and negative components of the measured currents.

According to a second embodiment, the rectifying and filtering means comprises a rectifier circuit, wherein the means for measuring the current measures the rectifier circuit output currents.

According to a development of the invention, the regulating means comprises at least one chopper circuit, means for measuring the chopper current, means for measuring the output voltage, and a control circuit comprising inputs connected to the means for measuring the current in the rectifying and filtering means, the means for measuring the chopper current and to the means for measuring the output voltage, and the control circuit comprising an output connected to a chopper control input.

In a preferred embodiment, the control circuit comprises a first regulating loop comprising a first operator, connected to the means for measuring the output voltage, and a voltage regulator, a second regulating loop comprising a second operator, connected to the means for measuring the current in the rectifying and filtering means, and a current regulator, and a third regulating loop comprising a third operator, connected to the means for measuring the chopper current, and a current regulator.

According to a particular embodiment, the input line comprises a reference neutral conductor, the rectifying and filtering means comprise a first filtering capacitor, connected between a first output of said means and the neutral conductor, and a second filtering capacitor, connected between a second output of said means and the neutral conductor, two independent choppers, connected respectively between the neutral conductor and the first and second outputs, the choppers supplying two output voltages, one positive and the other negative with respect to the potential of the neutral conductor.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DETAILED DESCRIPTION OF THE PREFERRED EMBODIMENT

Figure 1:
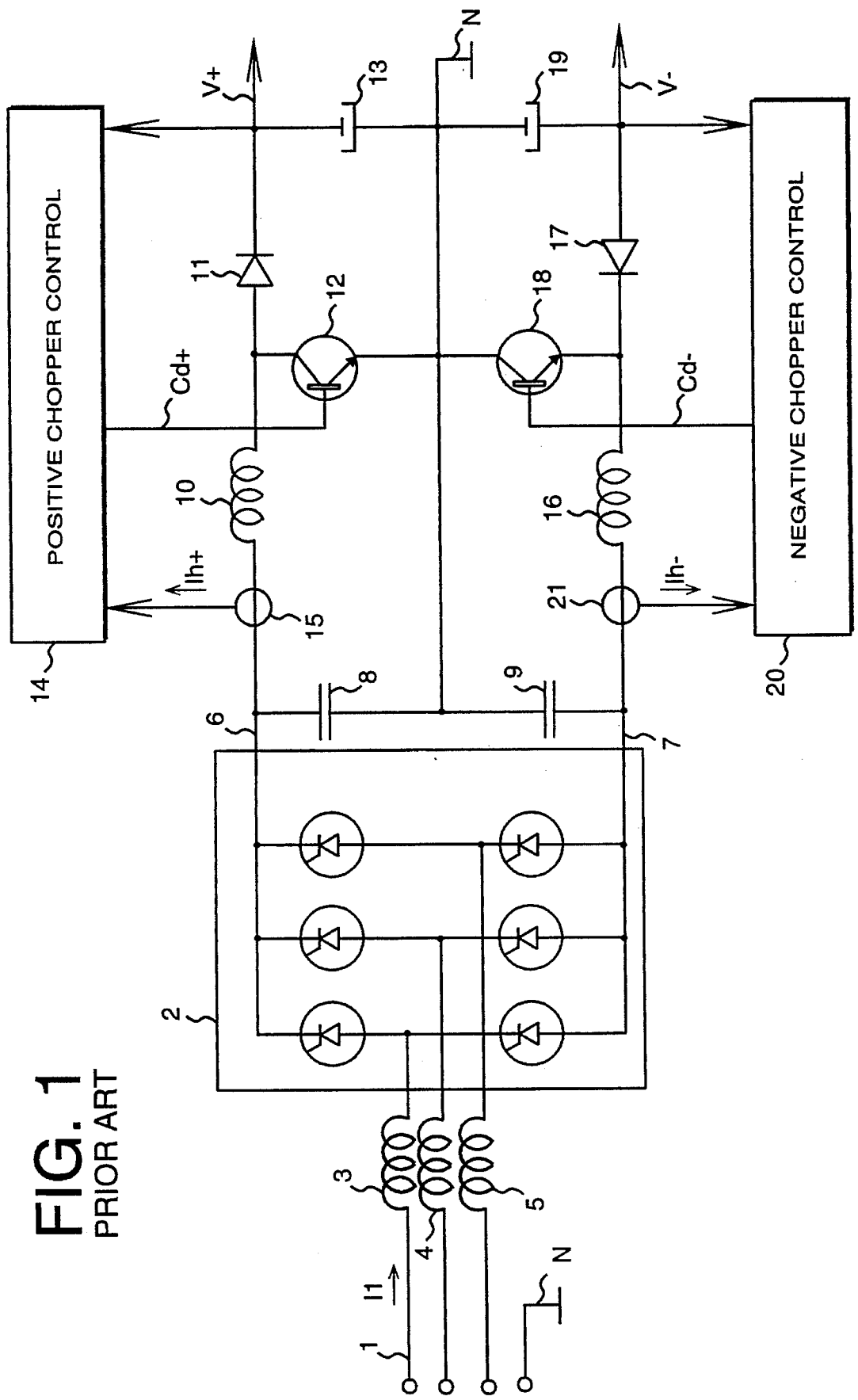
FIG. 1 represents a block diagram of a converter of known type.

The diagram of FIG. 1 represents a known AC-DC converter. The input line 1 comprises three conductors generally corresponding to the phase conductors of an electrical power distribution system. The input line conductors are connected to a current rectifier circuit 2 via filtering inductances 3, 4 and 5. In some converters the input line comprises a neutral conductor N, this conductor is then used as a reference when there is no electrical isolation between the input and output of the converter. The rectifier circuit 2 supplies the rectified current on two lines, a first line 6 for the positive components of the input currents and a second line 7 for the negative components of the input currents. Rectifying in the circuit is performed in a known manner by diodes, thyristors, or by active transistor-based rectifiers. The rectified currents output from the rectifier circuit 2 are filtered by capacitors 8 and 9. In FIG. 1, the capacitors 8 and 9 are connected respectively between the line 6 and conductor N and between the line 7 and conductor N. Filtering of the lines 6 and 7 enables two independent supply voltages to be supplied, one positive V+ and one negative V− with respect to the neutral conductor N, at the output of the converter. Regulation of the output voltages is performed by chopper circuits connected between the filtered lines 6 and 7 and the outputs of the converter voltages V+ and V−.

A first positive chopper circuit comprises an inductance 10 connected via a first end to the line 6, a diode 11 connected via its anode to a second end of the inductance 10 and via its cathode to the positive voltage output V+, a current switching transistor 12 connected via its collector to the common point between the inductance 10 and the anode of the diode 11 and via its emitter to the neutral conductor N. The transistor 12 receives control signals Cd+ on its base. A buffer capacitor 13 is connected between the positive output V+ and the neutral conductor. A control circuit 14 of the positive chopper controls the transistor 12 according to the voltage it receives from the output V+ and the value of the positive chopper current Ih+, i.e. the current in the inductor 10, measured by a senser 15. A second negative chopper circuit having the same structure as the first, but of different polarization, comprises an inductance 16 connected via a first end to the line 7, a diode 17 connected via its cathode to a second end of the inductance 16 and via its anode to the negative voltage output V−, a transistor 18 connected via its emitter to the common point between the inductance 16 and the cathode of the diode 17 and via its collector to the neutral conductor N. The transistor 18 receives control signals Cd− on its base. A buffer capacitor 19 is connected between the negative output V− and the neutral conductor. A control circuit 20 of the negative chopper controls the base of the transistor 18 according to the voltage it receives from the output V− and the value of the negative chopper current Ih−, i.e. the current in the inductance 16, measured by a sensor 21.

Further, with reference to FIG. 1 when the transistor 12 is on, the current in the inductance 10 increases up to a value defined by the control circuit 14. The transistor is then turned off and the current stored in the inductance is transferred via the diode 11 to the buffer capacitor 13 and a load connected to the positive output V+. The transistor 12 is then turned on again, the diode 11 prevents the capacitor 13 from discharging to the transistor 12, the current increases in the inductance 10 and the cycle continues. Operation of the negative chopper circuit is similar, but the voltage polarities and current directions are reversed.

Figure 2:
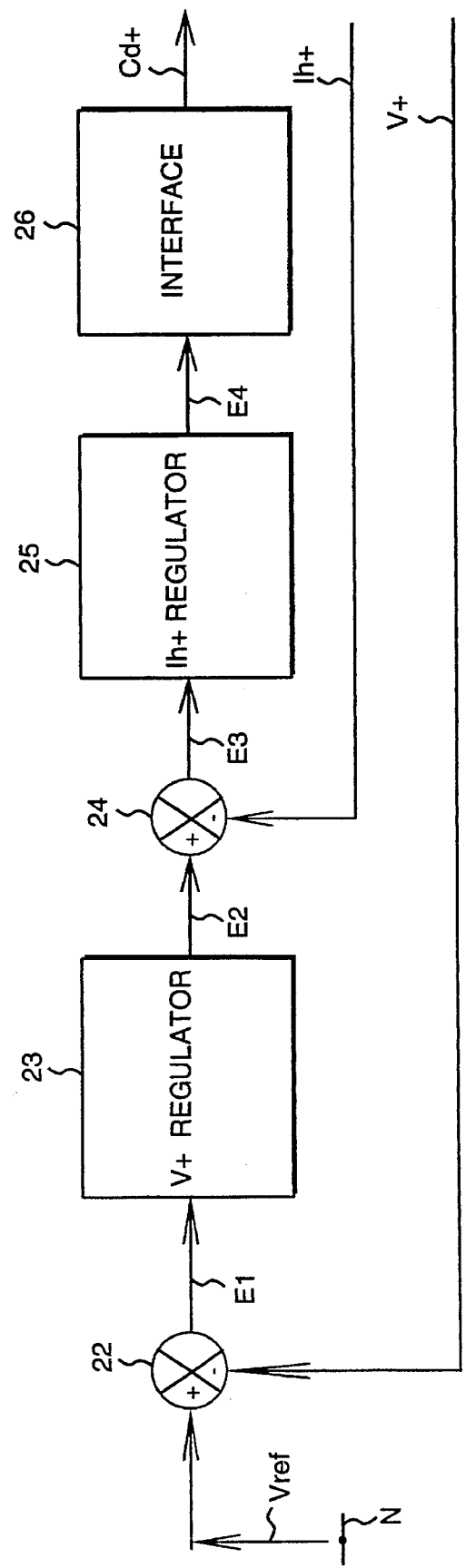
FIG. 2 shows the regulating mode of a chopper of the converter of FIG. 1.

A block diagram of the positive chopper control circuit 14 is represented in FIG. 2. A first operator 22 calculates the value E1 of the difference between a setpoint voltage Vref, referenced with respect to the neutral conductor, and the positive output voltage V+. This value E1 is applied to the input of a regulator 23 of the voltage V+. The regulator 23 supplies a correction value E2 to a second operator 24 for calculation of a value E3 representing the difference between the value E2 and the positive chopper current value Ih+. The value E3 is applied to the input of a regulator 25 of the positive chopper current Ih+. The output of the regulator 25 supplies a regulating value E4 to an interface circuit 26 for control of the transistor 12 by the signal Cd+. The regulators 23 and 25 comprise, in known manner, associations of operational elements such as integrators, derivators, comparators, attenuators or linear or complex amplifiers. Regulation of the positive chopper comprises, in this embodiment, a regulating loop of the current Ih+ nested in a general regulating loop of the output voltage V+.

The negative chopper control circuit 20 operates in the same way as the control circuit 14. The operating frequency of the choppers is generally from 10 to 50 KHz. The filter comprising inductors 3, 4, 5 and capacitors 8 and 9 must filter the chopper operating currents efficiently. The values of the inductors and capacitors can for example be respectively about 1 mH and 10 μF. This filter is of the LCR type, where R corresponds to the series resistance, of low value, of the power system input lines 1.

Rectifying of the input line AC currents, by the rectifier bridge 2, causes current steps which excite the LC filter 3, 4, 5, 8, 9. When the filter is excited, weakly dampened oscillations disturb the current in the power system.

Figure 3:
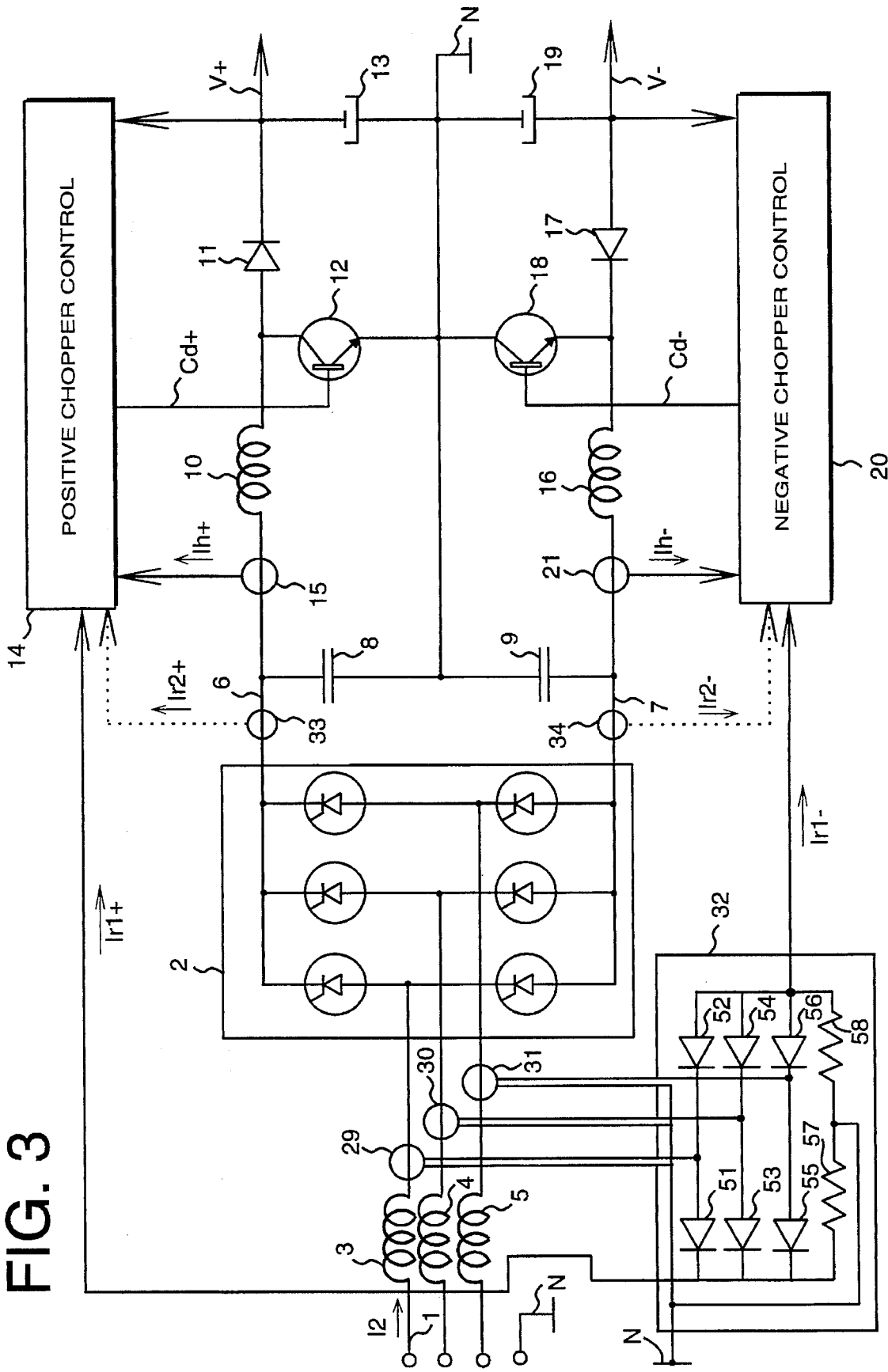
FIG. 3 represents a block diagram of a converter according to an embodiment of the invention.

FIG. 3 shows an embodiment of the invention which dampens the oscillations due to excitation of the filter. The converter according to FIG. 1 is completed by sensors 29, 30 and 31, represented by current transformers located on each input line conductor, for example between the inductors 3, 4, 5 and the rectifier circuit 2. The sensors 29, 30, 31 secondary currents representative of the currents flowing in the filter and rectifier. The sensor outputs are connected to the input of a circuit 32 for detection of the values of the positive component Ir1+ and negative component Ir1− of the secondary currents of the sensors. Circuit 32 comprises 3 pairs of diodes 51–56 and resistors 57, 58 arranged to provide positive component Ir1+ and negative component Ir1−. The values Ir1+ and Ir1− are supplied to inputs of the control circuits, respectively 14 and 20, for the choppers to be controlled so as to dampen the filter oscillations.

Values representative of the positive component Ir2+ and negative component Ir2− of the currents flowing in the filter and rectifier can be measured by sensors 33 and 34 placed on output of the rectifier 2, between the rectifier and the capacitors, respectively 8 and 9. The positive and negative components are, in this case, separated by the rectifier circuit 2. A detection circuit is then no longer of any use and the values Ir2+ and Ir2− are applied directly to inputs of the control circuits respectively 14 and 20.

Figure 4:
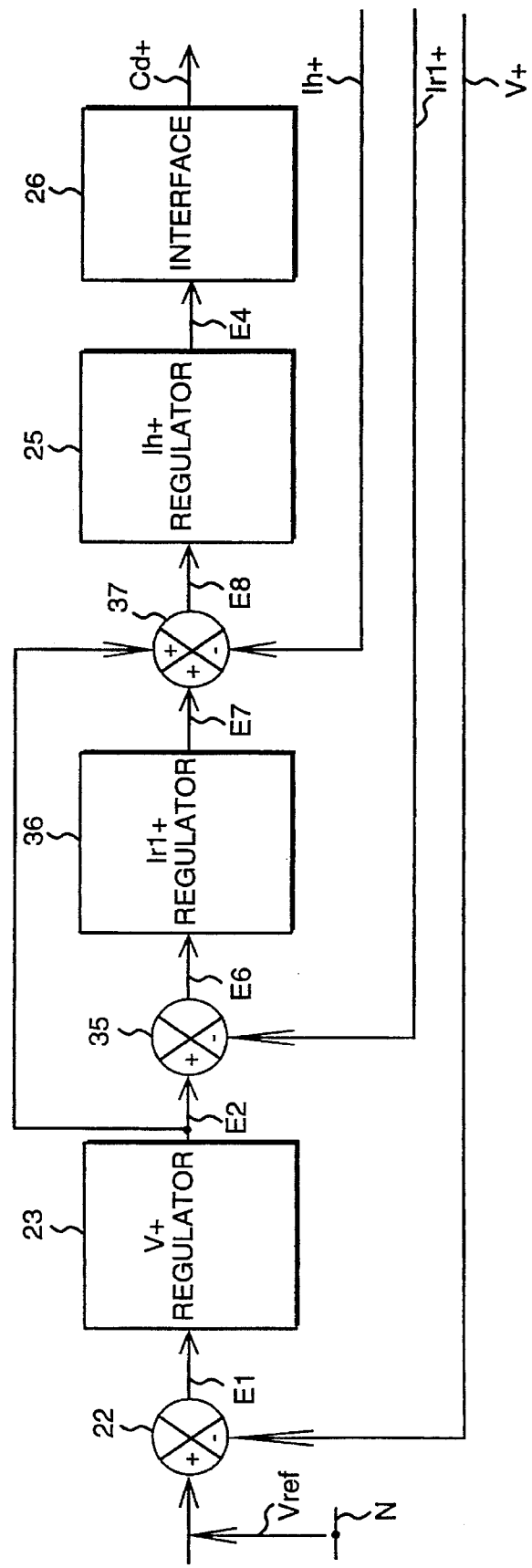
FIG. 4 shows a regulating mode of a chopper of the converter of FIG. 3.

In order for the choppers to dampen the filter oscillations, the values of the currents Ir1+, Ir1− or Ir2+ and Ir2− are integrated in an additional regulating loop of the control circuits 14 and 20. FIG. 4 shows an embodiment of regulation of the positive chopper control circuit 14 of FIG. 3, integrating a filter current regulating loop. The output voltage V+ is compared by the first operator to a reference value Vref. The value E1 of the difference between these two values is processed by the voltage regulator 23. On output of the regulator 23 a value E2 is applied to an input of a third operator 35 and possibly to an input of a fourth operator 37. The third operator 35 supplies a value E6 representative of the difference between the value E2 and the value of the filter current Ir1+. A current regulation circuit 36 receives the value E6 and supplies on output a regulating value E7. This value E7 is applied to an input of the fourth operator 37 which can also receive the output value E2 of the regulator 23. The operator 37 calculates a value E8 representative of the difference between the sum of the two regulated values E7 and E2 and the value Ih+ of the positive chopper current. The value E8 is supplied to the current regulator 25. The output of the regulator 25 supplies a value E4 to the interface circuit 26 for control of the transistor 12.

When the current Ir1+ increases rapidly in the filter, the operator 35 supplies a negative, non-zero value E6. This decrease of the value E6 is processed by the regulator 36 and leads to a decrease of E8. This decrease of E8 is processed by the regulator 25, then the interface circuit turns the transistor 12 on in order to absorb the excess current by the capacitor 13. The latter acts as a damper. If the filter current decreases rapidly, the value E6 increases, resulting in turn-off of the transistor. The structure and operation of the control circuits 14 and 20 are identical. A first loop monitors the output voltage V+ with respect to a setpoint voltage Vref. A second loop nested in the first loop regulates the filter current Ir1+ and a third loop nested in the second loop regulates the chopper current Ih+.

Figure 5:
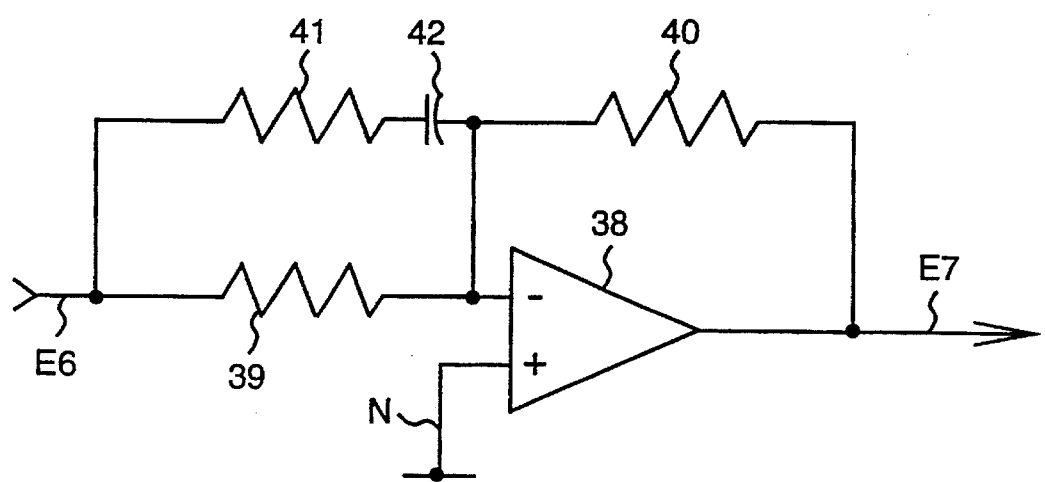
FIG. 5 represents a block diagram of an embodiment of an input current regulator.

The diagram of an embodiment of the regulation circuit 36 of the filter current Ir1+ is represented in FIG. 5. The circuit 36 comprises an operational amplifier 38. A resistance 39 is connected between the circuit input, receiving the value E6, and the inverting input of the amplifier 38. A resistance 40 is connected between the inverting input and the output of the amplifier 38. A resistance 41 is connected in series with a capacitor 42 between the circuit input and the inverting input. The non-inverting input is connected to the reference conductor N and the output of the amplifier supplies on output of the circuit the regulation value E7. The minimum, continuous, gain of the circuit corresponds to the ratio between the value of the resistance 40 and the value of the resistance 39. When the frequency of the input value E6 increases, the impedance formed by the resistance 41 and capacitor 42 decreases and the gain of the circuit increases. This circuit is a derivator preserving the stability of regulation by performing a phase lead.

Figure 6:
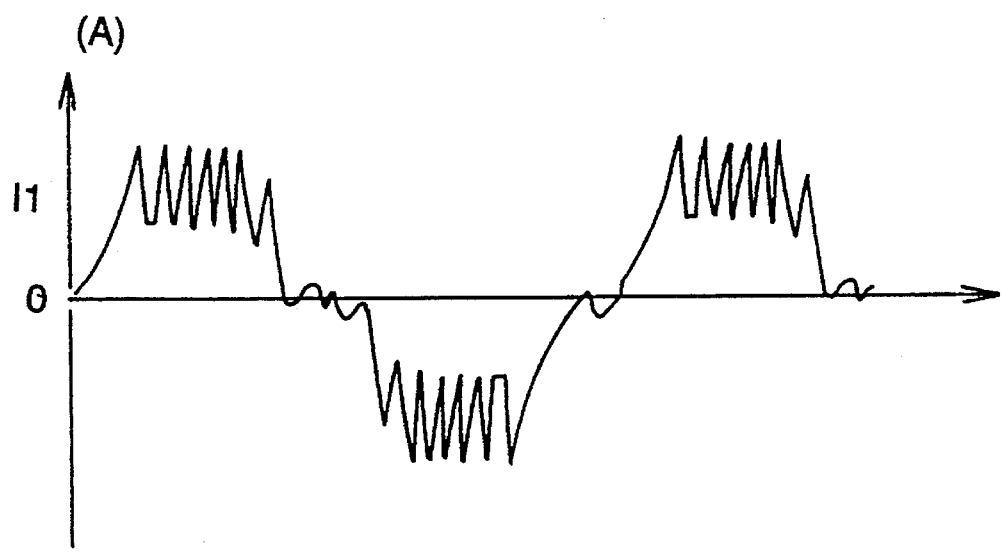
FIG. 6 illustrates an input current disturbed by filtering circuit oscillations.
Figure 7:
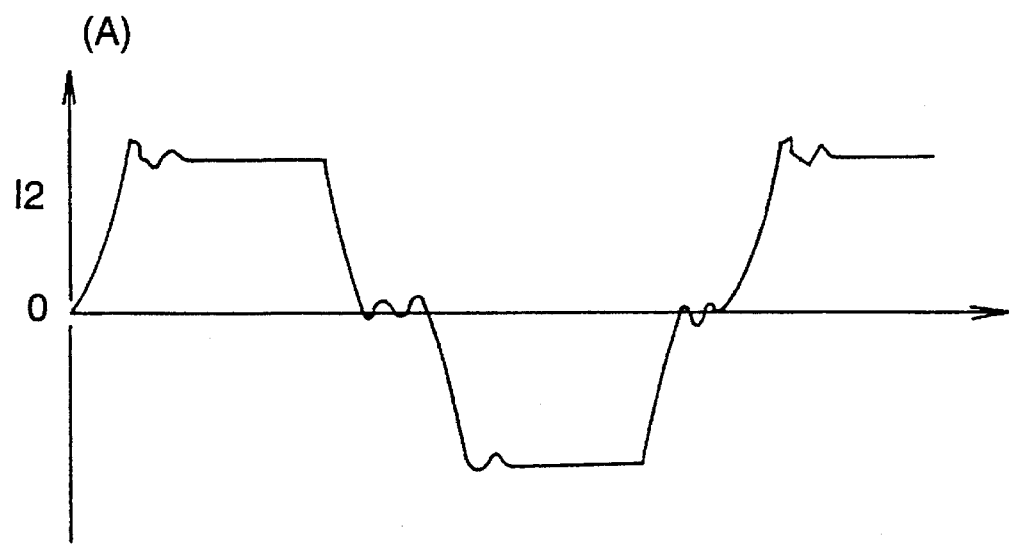
FIG. 7 illustrates an input current regulated according to an embodiment of the invention.

FIG. 6 illustrates an input current I1 disturbed by oscillations of the filter in a converter according to the embodiment of FIG. 1. At each main half-wave the rectifier circuit components are turned on and rapid current variations causes oscillations which are only slightly dampened. FIG. 7 shows a curve of an input current I2 in a converter according to the embodiment of FIG. 3, where the oscillations have been dampened by the choppers.

In the embodiments described above the control circuits can be achieved either by analog, digital or programmed circuits. They are used for control of choppers such as those of FIG. 3, but they could control any DC current regulating device other than the choppers.

The current sensors 29, 30, 31, 33 and 34 can be current transformers or any other component enabling the current to be measured, such as low value resistances, or Hall effect cells equipped with amplifiers and processing circuits. The regulating loops have been described according to a particular nesting order, but other embodiments can be achieved with different orders or additional regulating loops.

I claim:

1. An AC-DC converter, comprising:

an input line comprising at least two conductors;

rectifying and filtering means connected to the input line;

first and second means for monitoring and regulating, respectively, positive and negative components of a DC output voltage, connected to the output of the rectifying and filtering means;

means for measuring currents in the rectifying and filtering means, the currents being measured prior to the output of said rectifying and filtering means; and means for regulating the positive and negative components of the output voltage in terms of the currents measured by said measuring means, said measuring means comprising detection means to supply to said regulating means signals representative of the positive and negative components of the measured currents.

2. The converter according to claim 1, wherein the rectifying and filtering means comprises a rectifier circuit, and wherein the current measures means measuring the rectifier circuit input currents.

3. The converter according to claim 2, wherein the current measuring means comprises a current measuring transformer associated with each line conductor.

4. The converter according to claim 1, wherein the rectifying and filtering means comprises a rectifier circuit, and wherein the current measures means measuring the rectifier circuit output currents.

5. The converter according to claim 1, wherein the control circuit comprises a first regulating loop comprising a first operator having an input connected to the means for measuring the output voltage and an output connected to a voltage regulator, a second regulating loop comprising a second operator having an input connected to the means for measuring the current in the rectifying and filtering means and an output connected to a current regulator, and a third regulating loop comprising a third operator having an input connected to the means for measuring the chopper current and an output connected to a current regulator.

6. The converter according to claim 1, wherein the input line comprises a reference neutral conductor, said rectifying and filtering means comprising a first filtering capacitor, connected between a first output of said rectifying and filtering means and the neutral conductor, and a second filtering capacitor, connected between a second output of said rectifying and filtering means and the neutral conductor, two independent choppers, connected respectively between the neutral conductor and the first and second outputs, supplying two output voltages, one positive and the other negative with respect to the potential of the neutral conductor.

7. An AC-DC converter, comprising:

an input line comprising at least two conductors;

rectifying and filtering means connected to the input line;

first and second means for monitoring and regulating, respectively, positive and negative components of a DC output voltage, connected to the output of the rectifying and filtering means;

means for measuring currents in the rectifying and filtering means, the currents being measured prior to the output of said rectifying and filtering means; and means for regulating the positive and negative components of the output voltage in terms of the currents measured by said measuring means, the measuring means comprising detection means to supply to the regulating means signals representative of the positive and negative components of the measured currents, said regulating means comprising at least one chopper circuit, means for measuring the chopper current, means for measuring the output voltage, and a control circuit comprising inputs connected to (i) the means for measuring the current in the rectifying and filtering means, (ii) the means for measuring the chopper current, and (iii) the means for measuring the output voltage, the control circuit further comprising an output connected to a chopper control input.

* * * * *